United States Patent [19]

Sweeney

[11] 4,324,635

[45] Apr. 13, 1982

[54] GENERATION OF CHLORINE-CHLORINE DIOXIDE MIXTURES

[76] Inventor: Charles T. Sweeney, 448 Earle Rd., Hewitt, Tex. 76643

[21] Appl. No.: 180,674

[22] Filed: Aug. 25, 1980

[51] Int. Cl.$^3$ .............................................. C25B 9/00
[52] U.S. Cl. .................................. 204/266; 204/263; 204/265; 204/1 R
[58] Field of Search ............................... 204/257–258, 204/263, 265–266, 1 H

[56] References Cited

U.S. PATENT DOCUMENTS 3,524,801  8/1970  Parsi ....................................... 204/98
3,654,103  4/1972  McRae ................................. 204/101

Primary Examiner—R. L. Andrews
Attorney, Agent, or Firm—Neal J. Mosely

[57] ABSTRACT

An electrolytic generator is disclosed having two sealed compartments, separated by a cation exchange membrane, and having a cathode in one compartment and an anode in the other compartment. The cation exchange membrane is positioned directly in line between the anode and the cathode. The anode-containing compartment is provided with a bottom inlet for introduction of extra chlorine. A bypass flow line is provided between the anode and the cathode-containing compartments with a pump for circulating the solution from the cathode-containing compartment into the anode-containing compartment to control the pH therein. The anode-containing compartment is provided with a pH monitor to measure the pH adjacent to the anode and to operate the pump to pump the solution from the cathode-containing compartment to maintain a pH of about 1.8–5.0 in the anode-containing compartment. When the cell is filled with brine and energized, and the anode-containing compartment is maintained at pH 1.8–5.0 while bubbling chlorine therethrough, hydrogen is evolved from the cathode-containing compartment and a chlorine/chlorine dioxide mixture from the anode-containing compartment for use in bleaching or in treating bodies of water, such as, swimming pools, baths, reservoirs, sewage, etc.

1 Claim, 3 Drawing Figures

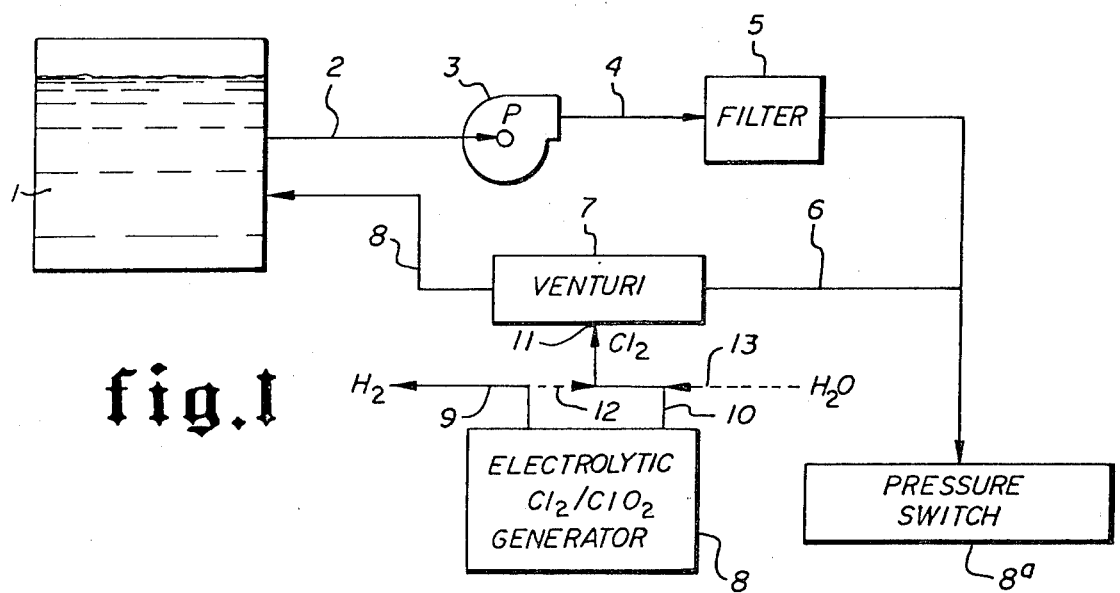
fig.1
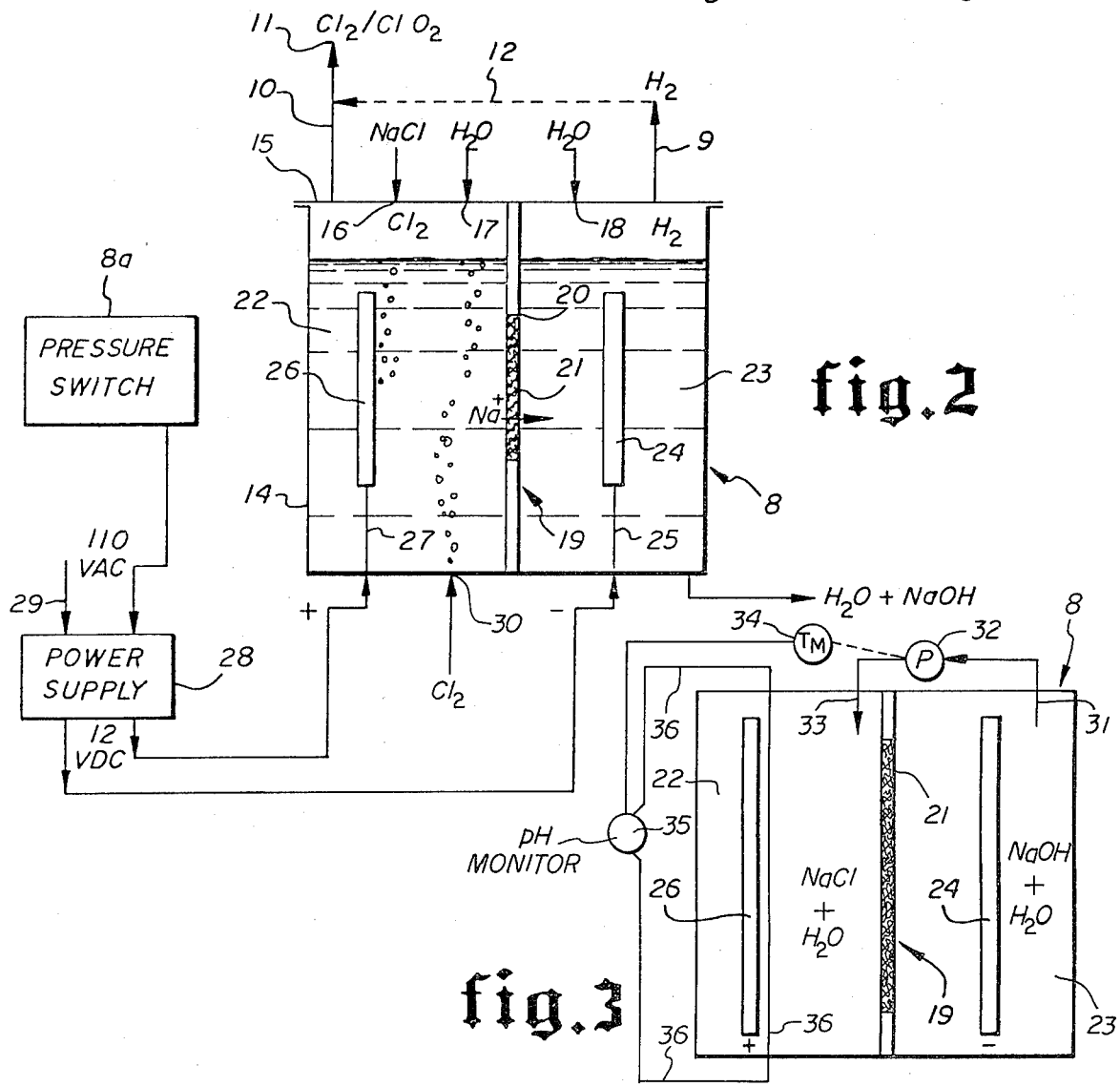
fig.2
fig.3

GENERATION OF CHLORINE-CHLORINE DIOXIDE MIXTURES

BACKGROUND OF THE INVENTION

1. Field of the Invention

This invention relates to new and useful improvements in electrolytic generators and to methods of generating mixtures of chlorine and chlorine dioxide and to systems of apparatus for generating mixtures of chlorine and chlorine dioxide for treating bodies of water, such as, swimming pools, baths, reservoirs, sewage, etc., and for bleaching chemical pulp, etc.

2. Brief Description of the Prior Art

The use of chlorine for disinfecting bodies of water, such as, swimming pools, baths, reservoirs, sewage, etc. is well known. In the past, chlorine has usually been supplied by direct application of chlorine gas from tanks containing the gas under pressure. There have also been a number of attempts to provide chlorine gas on a more limited scale by continuous electrolytic generating equipment.

The use of chlorine dioxide in disinfecting bodies of water and in bleaching chemical pulp is well known. Chlorine dioxide is a dangerous and explosive gas and is usually produced as an aqueous solution at the point of usage by chemical decomposition of chlorite salts. The production of chlorine dioxide electro-chemically from chlorides is unknown in the literature.

Lindstaedt U.S. Pat. No. 2,887,444 discloses a system in which a body of water, such as, a swimming pool, is provided with a low concentration of dissolved common salt and a stream of water is removed from the main body and electrolyzed to produce chlorine and the chlorine and water stream returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for production of chlorine for chlorinating bodies of water are shown in Murray U.S. Pat. No. 2,361,663, Oldershaw U.S. Pat. No. 3,351,542, Colvin U.S. Pat. No. 3,378,479, Kirkham U.S. Pat. No. 3,669,857, and Yates U.S. Pat. No. 4,097,356. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosufonic acid polymer membranes. The perfluorosulfonic acid membranes were developed by Dupont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338; 3,560,568; 3,496,077; 2,967,807; 3,282,875 and British Pat. No. 1,184,321 as disclosing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat. No. 4,010,085 and Westerlund U.S. Pat. No. 4,069,128.

Discussion of perfluorosulfonic acid membranes is also discussed in the technical literature, e.g., Dupont Magazine, May–June 1973, pages 22–25 and a paper entitled "Perfluorinated Ion Exchange Membrane" by Grot, Munn and Walmsley, presented to the 141st National Meeting of the Electro-Chemical Society, Houston, Texas, May 7–11, 1972.

The structure of electrodes used in electrolytic cells is set forth in most of the patents listed above. Additionally, the following U.S. patents disclose particular configurations of anodes or cathodes used in electrolytic cells.

Giacopelli U.S. Pat. No. 3,375,184 discloses an electrolytic cell with controlable multiple electrodes which are flat plates of wedge-shaped configuration.

Ettel U.S. Pat. No. 3,821,097 discloses the use of flat plates in electroplating cells.

Lohrberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl", Electrochemical Technology 5, 56–58 (1967) Western and Hoogland report that $ClO_2$ is not produced in the electrolysis of NaCl in the absence of chlorates.

SUMMARY OF THE INVENTION

One of the objects of this invention is to provide a new and improved system of treatment and method of treatment of bodies of water, such as, swimming pools, baths, reservoirs, sewage, etc., and bleaching of chemical pulp, etc., utilizing an electrolytic cell of novel construction.

Another object of this invention is to provide a new and improved electrolytic cell for production of mixtures of chlorine and chlorine dioxide for treatment of bodies of water and bleaching.

Another object of this invention is to provide a new and improved electrolytic cell having an arrangement comprising an anode and a cathode and a cation exchange membrane, which produces a mixture of chlorine and chlorine dioxide.

Still another object of this invention is to provide a method of producing a mixture of chlorine and chlorine dioxide by electrolysis of an aqueous solution of a chloride salt.

Still another object of this invention is to provide a method and apparatus in which chlorine dioxide is produced by electrolysis of an aqueous solution of chloride salt utilizing an anode, cathode, and a cation exchange membrane, means for pumping solution from the cathode-containing compartment to the anode-containing compartment to control pH therein, and a pH monitor controlling the pumping means in response to pH adjacent to the anode.

Other objects of this invention will become apparent from time to time throughout the specification and the claims as hereinafter related.

The foregoing objects are achieved by use of an electrolytic generator having two sealed compartments, separated by a cation exchange membrane, and having a cathode in one compartment and an anode in the other compartment. The cation exchange membrane is positioned directly in line between the anode and the cathode. The anode-containing compartment is provided with a bottom inlet for introduction of extra chlorine. A bypass flow line is provided between the anode and the cathode-containing compartments with a pump for circulating the solution from the cathode-containing compartment into the anode-containing compartment to control the pH therein. The anode-containing compartment is provided with a pH monitor to measure the pH adjacent to the anode and to operate the pump to pump in the solution from the cathode-containing compartment to maintain a pH of about 1.8–5.0 in the anode-containing compartment. When the cell is filled with brine and energized, and the anode-containing compartment is maintained at pH 1.8–5.0 while bubbling chlorine therethrough, hydrogen is evolved from the cathode-containing compartment and a chlorine/chlorine dioxide mixture from the anode-containing compartment for use in bleaching or in treating bodies of water, such as, swimming pools, baths, reservoirs, sewage, etc.

BRIEF DESCRIPTION OF THE DRAWINGS

FIG. 1 is a schematic view of a treatment system for a body of water using an electrolytic generator for producing a chlorine-chlorine dioxide mixture.

FIG. 2 is a schematic view, in elevation, of a preferred embodiment of the electrolytic generator to be used in the system shown in FIG. 1 or elsewhere.

FIG. 3 is a plan view of the electrolytic generator shown in FIG. 2.

DESCRIPTION OF THE PREFERRED EMBODIMENT

Referring to the drawings by numerals of reference and more particularly to FIG. 1, there is shown a system for treatment of a body of water, such as, a swimming pool, bath, reservoir, body of sewage, etc. with a mixture of chlorine and chlorine dioxide. A body of water 1 is connected by a conduit 2 to a pump 3. The outlet side of pump 3 is connected by conduit 4 to a filter 5. The other side of filter 5 is connected by conduit 6 to the inlet side of the venturi mixer 7, the outlet side of which is connected by conduit 8 back to the body of water 1. The system shown provides for circulation of water from the body of water 1 by pump 3 accompanied by filtration in filter 5 and mixing in venturi mixer 7 before the water is returned to the main body of water 1. The system includes an electrolytic generator 8 which will be described more fully hereinafter.

Electrolytic generator 8 produces hydrogen in the cathode-containing compartment which is discharged as is indicated at 9. When operated as described below, the generator produces a chlorine-chlorine dioxide mixture in the anode-containing compartment which is discharged as indicated at 10 and introduced into the venturi mixer 7 as indicated at 11. Optionally, the hydrogen produced in the electrolytic generator may be mixed with the chlorine-chlorine dioxide mixture as indicated at 12 and introduced as a mixture into the venturi mixer 7.

Also, the mixture of chlorine dioxide and chlorine (optionally including hydrogen) may be mixed with a stream of water as indicated at 13 (also see FIG. 16 of copending applications Ser. No. 92,645; 121,114 or 121,115) for introduction into the venturi mixer 7. The introduction of water as indicated at 13 may be in any conventional conduit system or may be in the form of a water-gas aspirator system in which the flow of water sucks in the mixture of chlorine dioxide and chlorine (and optionally hydrogen) gas discharged from electrolytic generator 8. Systems of this general type which produce only chlorine are shown in Lindsteadt U.S. Pat. No. 2,887,444, Murray U.S. Pat. No. 3,223,242 and Yates U.S. Pat. No. 4,097,356.

The apparatus as shown can be operated in conjunction with conventional timing circuits as in various prior patents cited above and may also be operated in conjunction with switches that are energized simultaneously with the water circulating pump or the electrolytic generator may be energized in response to a flow switch or a pressure switch 8a so that it operates whenever water is circulating through the system shown in FIG. 1.

The electrolytic generator 8, shown schematically in FIG. 1, is of an improved design, as shown in FIGS. 2 and 3 of the drawings. The preferred embodiment of the electrolytic generator 8, as shown in FIGS. 2 and 3, produces a mixture of chlorine dioxide and chlorine gas and may be used in any application where such mixtures are useful, in addition to the specific application described above.

In FIGS. 2 and 3, electrolytic generator 8 consists of a hollow container 14 having a removable cover 15 sealed in place and having openings 16 and 17 for introduction of water and a chloride salt (NaCl) to the anode-containing compartment, and opening 18 for introduction of water to the cathode-containing compartment.

Hollow container 14 is divided by vertically extending wall 19 which has window opening 20 in which there is positioned ion-permeable membrane 21. Ion-permeable membrane 21 is a suitable cation exchange, electrically conductive membrane of the type conventionally used in electrolytic cells provided with membrane separation of the anode and the cathode-containing compartments. The preferred membranes are fluorinated polymers and preferably perflurosulfonic acid polymers, preferably NAFION, manufactured by Dupont. Wall member 19 including membrane 21 divides the interior of container 14 into an anode-containing compartment 22 and a cathode-containing compartment 23. A cathode 24 is positioned in cathode compartment 23 and connected by electric lead 25 to a point external to container 14. Anode 26 is positioned in anode-containing compartment 22 and is connected by electric lead 27 to a point external to container 14. The apparatus is provided with a power supply, such as, a transformer 28 powered by 110 volt power source 29 and providing a 12 volt D.C. output connected to electric leads 25.

Anode-containing compartment 22 is provided with a bottom inlet 30 for bubbling of chlorine gas therethrough. Cathode-containing compartment 23 is connected by conduit 31 (see FIG. 3) to metering pump 32 which, in turn, is connected by conduit 33 to anode-containing compartment 22. Pump 32 is controlled by timing motor 34 which is controlled by pH monitor 35. Conduits or probes 36 extend from pH monitor 35 into compartment 22 adjacent to anode 26 and function in response to the pH of the solution therein.

The cathode 24 is preferably a flat plate of steel or the like. The anode 26 is preferably a flat plates of carbon. Other shapes and other materials of construction may be used for the anode and cathode which are known in the art.

OPERATION

The electrolytic generator described and shown in FIGS. 2 and 3 has been tested and found to be a apparatus for the electrochemical generation of mixtures of chlorine and chlorine dioxide.

In the electrolytic generator shown, the cell is charged with water and salt, or brine, in the anode-containing compartment 22; and with water, i.e. aqueous electrolyte, in the cathode-containing compartment 23, to a level above the top of the various electrodes but leaving a sufficient space at the top for the collection of gases. The ion-permeable membrane 21 in the cell was Dupont NAFION.

The system was turned on. 12 volt D.C. were applied and monitored by a D.C. ammmeter in the circuit. The current flow was 20 amp. and voltage readings of the solution were nearly constant, at about 12 V., throughout the operation. This indicated that the anode-containing compartment represented a single uniform resistance relative to the cathode. Chlorine gas was bubbled through anode-containing compartment 22 and the pH was monitored and controlled by pH monitor 35. There was immediate visible generation of hydrogen at the cathode 24. After a short period of time gas begins to form vigorously at the anode 26.

The gas produced at the anode 26 was found to consist of a mixture of chlorine and chlorine dioxide so long as the pH in compartment 22 was maintained in the range of 1.8–5.0. The proportions $Cl_2$ and $ClO_2$ varied under different conditions of operation, i.e. pH, in the specified range, but in most cases the $ClO_2$ is present as a substantial proportion of the $Cl_2$. The cell was operated with the pH in compartment 22 varied from about 1.8–5.0. At very low pH, less than about 1.8, chlorine dioxide does not form and the gas consists of a mixture of chlorine and oxygen. At higher pH, i.e. above about 5.0, chlorine dioxide does not form.

It is therefore necessary to keep the pH in the range of about 1.8–5.0. Since chlorine gas is being bubbled through the compartment 22 and chlorine is generated at anode 26 the pH drops rapidly when the cell is started up due to the in situ formation of HCl. In cathode-containing compartment 23, there is a rapid build up of dissolved NaOH in solution. A small amount of this solution is pumped by pump 32 to compartment 22 to maintain a predetermined pH therein, preferably about 1.9–2.2 but with no wider pH variation than 1.8–5.0. The pH is accurately monitored by monitor 35 which controls timing motor 34 to determine the operation of pump 32 which meters in the desired amount of caustic solution.

In collecting and analyzing gases from this cell, the gases produced in anode-containing compartment 22 and in cathode-containing compartment 23 can be separately removed. Gas discharge lines 10 and 9, respectively, are provided at the top of the of the anode-containing compartment 22 and cathode-containing compartment 23 to collect the gases therefrom.

A slight negative pressure was maintained on the anode-containing compartment by use of an aspirator connected to a water supply and connected to the gas discharge line 10. The gases from the anode-containing compartment 22 were removed as produced and were passed through a scrubber system to separate the chlorine and chlorine dioxide. A sodium hydroxide scrubber was placed on the suction of the separators to absorb chlorine and chlorine dioxide produced between runs.

The arrangement for separating chlorine from chlorine dioxide consisted of a separator which was a 100 ml. Nessler tube containing 90 ml. of a 10 g/liter solution of glycine in water followed by a 100 ml. Nessler tube containing 90 ml. of a 50 g/liter solution of potassium iodide which was acidified to pH 1.5 with sulfuric acid.

The glycine reacted with the chlorine to produce the monochloro and dichloro addition product with glycine. The unreacted chlorine dioxide was absorbed in the glycine solution or passed into the second tube where it reacted with the acidified potassium iodide to release iodine.

The glycine solution was analyzed for chlorine and chlorine dioxide by the D.P.D. mehod 409 E, Standard Methods for Examination of Water and Waste Water, 14th Edition, American Public Health Association. The potassium iodide solution was analyzed for chlorine dioxide by the Iodometric Method, 411 A, Standard Method for Examination of Water and Waste Water.

This analytical technique for separation of chlorine dioxide and chlorine is accepted as accurate when both gases are in the vapor phase as was the case in this study. Analytical results on the efficiency of the separation technique were in general agreement with those reported by Aiteta, et al., Stamford University, EPA Symposium, Cincinnati, Ohio, Sept. 18–20, 1978, and were considered acceptable.

In this case, the electrolysis was carried out at 12 volts and 20 amp. The gases obtained from the anode-containing compartment 22 were a mixture of 1.0 parts chlorine dioxide per one part chlorine, when the cell was operated at pH 1.9 in compartment 22. When the cell was operated at pH 3.5 in compartment 22, the ratio of gases was 0.40 part chlorine dioxide per one part chlorine. At pH 5.0, the output ratio was 0.2 part chlorine dioxide per part chlorine. The optimum pH range is about 1.9–2.2. These conditions of operation, of course, require the continuous bubbling of chlorine gas through the compartment 22 in addition to the chlorine which is producte electrochemically at anode 26. As noted above, the cell can be operated in the preferred range by use of the pH monitor 35 which controls the metering of caustic solution from compartment 23 to compartment 22.

The removal of $Cl_2/ClO_2$ mixture and hydrogen and of caustic solution from the chlorine/chlorine dioxide generator cell 8 is shown schematically, as is the introduction of water and table salt, or brine, to the generator. Specific construction involves conventional structure in electrolytic cells and in gas recovery from such cells. Cell structures of the type shown in almost any of the patents referred to above can be used in production of a $Cl_2/ClO_2$ generator in accordance with this invention provided that the pH is controlled and acation exchange membrane is used as described. The collection of hydrogen and of the $Cl_2/ClO_2$ mixture may involve simple gas collection apparatus and may, if desired, involve the use of systems for mixing the hydrogen and $Cl_2/ClO_2$ gas mixture with water for introduction into a body of water as described in connection with FIG. 1 above. Also, the equipment can be used in association with timers or in connection with flow controlling switches or controls or in connection with pressure responsive switches and controls as described in any of the patents listed above.

In carrying out this process, any soluble chloride salt may be used, e.g. NaCl, KCl, LiCl, RbCl, CsCl, $NH_4Cl$, $MgCl_2$, $CaCl_2$, etc., although for economic reasons sodium chloride is preferred. Since this apparatus is operated under conditions which produce mixtures of chlorine dioxide and chlorine, the product gases may be used for many of the purposes for which chlorine dioxide is used and may also be used for many of the purposes for which chlorine is used. This mixture is particularly efficient in disinfecting bodies of water, such as, water reservoirs, swimming pools, sewage, etc. and in bleaching chemical pulps. For reasons of safety the gases are preferably recovered as aqueous solutions for storage or in-situ use.

While this invention has been fully and completely with special emphasis upon one preferred embodiment, it should be understood that within the scope of the appended claims the invention may be practiced otherwise than as specifically described herein.

I claim:

1. An electrolytic gas generator for production of chlorine-chlorine dioxide mixtures comprising a hollow container having a wall including a permeable cation exchange membrane, dividing said container into two compartments, an anode positioned in one compartment and a cathode positioned in the other compartment, an outlet from each of said compartments for removal of gasses therefrom, an inlet to the bottom portion of said anode-containing compartment for continuous introduction of chlorine gas thereto, inlets to the top portion of each of said compartments for introduction of a chloride salt solution to said anode-containing compartment and an aqueous electrolyte to said cathode-containing compartment, means for maintaining the pH of said anode-containing compartment in a predetermined range, comprising a pump and associated conduits for circulating caustic solution in controlled, selected amounts from said cathode-containing compartment to said anode-containing compartment and pH monitoring and controlling means controlling operation of said pump, said generator being operable, when filled with an aqueous solution of chloride salt in said anode-containing compartment and with aqueous electrolyte in said cathode-containing compartment and energized, and circulating additional quantities of chlorine therethrough while maintaining said anode-containing compartment at pH 1.8–5.0, to produce a mixture of chlorine and chlorine dioxide therein.

* * * * *